United States Patent
Kim

(10) Patent No.: US 12,456,212 B2
(45) Date of Patent: Oct. 28, 2025

(54) ELECTRONIC APPARATUS AND IMAGE PROCESSING METHOD THEREOF

(71) Applicant: SAMSUNG ELECTRONICS CO., LTD., Suwon-si (KR)

(72) Inventor: Hyungrae Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 246 days.

(21) Appl. No.: 18/195,516

(22) Filed: May 10, 2023

(65) Prior Publication Data
US 2023/0386057 A1   Nov. 30, 2023

Related U.S. Application Data

(63) Continuation of application No. PCT/KR2023/003761, filed on Mar. 22, 2023.

(30) Foreign Application Priority Data

May 26, 2022   (KR) .................... 10-2022-0064784

(51) Int. Cl.
*G06T 7/55*   (2017.01)
*G06T 5/20*   (2006.01)
*G06T 7/11*   (2017.01)

(52) U.S. Cl.
CPC .............. *G06T 7/55* (2017.01); *G06T 5/20* (2013.01); *G06T 7/11* (2017.01); *G06T 2207/20024* (2013.01); *G06T 2207/20224* (2013.01)

(58) Field of Classification Search
CPC ..... G06T 7/55; G06T 5/20; G06T 7/11; G06T 2207/20024; G06T 2207/20224
See application file for complete search history.

(56) References Cited

U.S. PATENT DOCUMENTS 8,325,978 B2   12/2012   Chai et al.
8,917,954 B2   12/2014   Kim et al.
(Continued)

FOREIGN PATENT DOCUMENTS

JP   2009-64421 A   3/2009
KR   10-2011-0037472 A   4/2011
(Continued)

OTHER PUBLICATIONS

S. Yousefi, F. A. Kondori and H. Li, "3D visualization of single images using patch level depth," Proceedings of the International Conference on Signal Processing and Multimedia Applications, Seville, Spain, 2011, pp. 1-6. (Year: 2011).*
(Continued)

Primary Examiner — Andrae S Allison
(74) Attorney, Agent, or Firm — Sughrue Mion, PLLC

(57) ABSTRACT

An electronic apparatus includes a memory and a processor that obtains second depth information of a second image frame subsequent to the first image frame, obtains an image difference value between the first image frame and the second image frame, obtains final depth information corresponding to a second image frame by applying a first weight and a second weight to a first depth information and a second depth information, respectively, and generates an image related to the second image frame based on the obtained final depth information.

20 Claims, 16 Drawing Sheets

(56) References Cited

U.S. PATENT DOCUMENTS

| | | | |
|---|---|---|---|
| 8,923,604 | B2 | 12/2014 | Kim et al. |
| 10,991,111 | B2 | 4/2021 | Ha et al. |
| 11,178,324 | B2* | 11/2021 | Huang .................. H04N 23/67 |
| 11,443,445 | B2 | 9/2022 | Gan et al. |
| 11,741,570 | B2* | 8/2023 | Lim ...................... H04N 19/59 |
| | | | 375/240.24 |
| 12,008,769 | B2 | 6/2024 | Park et al. |
| 2009/0066693 | A1 | 3/2009 | Carson |
| 2010/0111358 | A1 | 5/2010 | Chai et al. |
| 2013/0135430 | A1 | 5/2013 | Liu et al. |
| 2013/0266212 | A1 | 10/2013 | Kim et al. |
| 2013/0286017 | A1 | 10/2013 | Marimón Sanjuan et al. |
| 2016/0366353 | A1* | 12/2016 | Kobayashi ................ G06T 5/50 |
| 2018/0164898 | A1* | 6/2018 | Liang ................... G06F 3/0325 |
| 2018/0293745 | A1 | 10/2018 | Ha et al. |
| 2019/0130543 | A1* | 5/2019 | Kim ......................... G06T 5/70 |
| 2022/0012897 | A1 | 1/2022 | Park et al. |
| 2022/0076427 | A1* | 3/2022 | Lim ....................... G06T 7/187 |
| 2022/0245772 | A1* | 8/2022 | Gilcher .................... G06T 7/50 |

FOREIGN PATENT DOCUMENTS

| | | |
|---|---|---|
| KR | 10-2011-0090973 A | 8/2011 |
| KR | 10-1086274 B1 | 11/2011 |
| KR | 10-2013-0114420 A | 10/2013 |
| KR | 10-2018-0113043 A | 10/2018 |
| KR | 10-2262832 B1 | 6/2021 |
| KR | 10-2292559 B1 | 8/2021 |
| KR | 10-2306432 B1 | 9/2021 |
| KR | 10-2022-0067752 A | 5/2022 |
| KR | 10-2642927 B1 | 3/2024 |

OTHER PUBLICATIONS

Pedersen, Marius, and Jon Yngve Hardeberg. "A new spatial filtering based image difference metric based on hue angle weighting." Journal of Imaging Science and Technology 56.5 (2012): 50501-1. (Year: 2012).*

X. Lin, Y. Li, J. Zhu and H. Zeng, "DeflickerCycleGAN: Learning to Detect and Remove Flickers in a Single Image," in IEEE Transactions on Image Processing, vol. 32, pp. 709-720, 2023, doi: 10.1109/TIP.2022.3231748. (Year: 2022).*

J. Shotton et al., "Efficient Human Pose Estimation from Single Depth Images," in IEEE Transactions on Pattern Analysis and Machine Intelligence, vol. 35, No. 12, pp. 2821-2840, Dec. 2013 (Year: 2013).*

Hu et al., "Visualization of Convolutional Neural Networks for Monocular Depth Estimation," ICCV2019, pp. 3869-3878, 2019.

Written Opinion (PCT/ISA/237) issued Jun. 8, 2023 by the International Searching Authority in International Application No. PCT/KR2023/003761.

International Search Report (PCT/ISA/210) issued Jun. 8, 2023 by the International Searching Authority in International Application No. PCT/KR2023/003761.

* cited by examiner

ELECTRONIC APPARATUS AND IMAGE PROCESSING METHOD THEREOF

CROSS-REFERENCE TO RELATED APPLICATION(S)

This application is a bypass continuation of International Application No. PCT/KR2023/003761, filed on Mar. 22, 2023, which is based on and claims priority to Korean Patent Application No. 10-2022-0064784, filed on May 26, 2022, in the Korean Intellectual Property Office, the disclosures of which are incorporated by reference herein in their entireties.

BACKGROUND

1. Field

This disclosure relates to an electronic apparatus and an image processing method thereof, and more particularly, to an electronic apparatus for obtaining depth information from a two-dimensional (2D) image and an image processing method thereof.

2. Description of the Related Art

To obtain three-dimensional (3D) spatial information, one or more methods may be used. For example, methods for predicting depth information by using two or more 2D cameras, measuring depth information by using a lidar sensor, configuring spatial information by using a 2D camera combined with a gyro sensor, configuring spatial information by synthesizing several 2D background images, may be used. However, these methods have a disadvantage in that a separate device may be required, resulting in a high cost, and/or it may be necessary to capture and synthesize lots of 2D images capable of obtaining spatial information by moving by a photographer.

Recently, research has been conducted related to a method for predicting depth information based on a one-piece fixed 2D camera image based on a deep neural network (DNN) technology, and for example, a monocular depth estimation technology is being studied. To implement the technology, first, building learning data for learning a DNN may be required. For this, tens of thousands of 2D RGB images and ground truth (GT) data of each image is prepared as a pair. The GT data is data representing depth information of a corresponding 2D image, and may generally have one piece of information per one 2D image pixel. When a corresponding data set is prepared, a DNN model structure is designed and a prediction engine is made by learning the DNN model structure. Thereafter, when a 2D image is put into an input of a model created in an actual utilization step, DNN predicts depth information of the input image based on the learned information. However, the monocular depth estimation technology may have a problem in that accuracy is not that high compared to a method of using multiple 2D cameras and/or a lidar sensor.

SUMMARY

In accordance with an aspect of the disclosure, an electronic apparatus includes a memory configured to store a first image frame and first depth information of the first image frame; and at least one processor connected to the memory, wherein the at least one processor is configured to: obtain second depth information of a second image frame that is subsequent to the first image frame, obtain an image difference value between the first image frame and the second image frame, identify a first weight corresponding to the first depth information and a second weight corresponding to the second depth information, wherein the first weight and the second weight are based on the obtained image difference value and a threshold value, obtain final depth information corresponding to the second image frame by applying the first weight to the first depth information and applying the second weight to the second depth information, and generate, based on the obtained final depth information, an image related to the second image frame or transmit the obtained final depth information to an external device.

The at least one processor may be further configured to identify the first weight and the second weight so that the second weight increases and the first weight decreases in proportion to the image difference value.

The at least one processor may be further configured to obtain the final depth information by applying a third weight for Infinite Impulse Response (IIR) filtering to the first depth information to which the first weight is applied and applying a fourth weight for HR filtering to the second depth information to which the second weight is applied.

The at least one processor may be further configured to: segment the second image frame into a plurality of first regions, identify a second region corresponding to each of the plurality of first regions in the first image frame, identify a difference value between second regions corresponding to each of the plurality of first regions, identify at least one region of the plurality of first regions based on the identified difference value, and identify the first weight corresponding to the first depth information and the second weight corresponding to the second depth information, based on the identified difference value and the threshold value for the identified at least one region.

The at least one processor may be further configured to segment the second image frame into the plurality of first regions based on a depth value for each pixel region included in the second image frame, or segment the second image frame into the plurality of first regions based on a pixel value for each pixel region included in the second image frame.

The at least one processor may be further configured to: spatially diffuse the image difference value obtained from at least one region included in the first image frame and the second image frame a predetermined number of times, and identify the first weight corresponding to the first depth information and the second weight corresponding to the second depth information, based on the spatially diffused image difference value and the threshold value.

The at least one processor may be further configured to: obtain a pixel difference value between a plurality of first pixel regions included in the first image frame and a plurality of second pixel regions included in the second image frame, and obtain the image difference value based on the pixel difference value, or obtain the image difference value based on optical flow information obtained from the first image frame and the second image frame.

The at least one processor may be further configured to: based on the obtained image difference value being greater than the threshold value, identify the first weight corresponding to the first depth information and the second weight corresponding to the second depth information, based on the image difference value and the threshold value, and based on the image difference value being less than or equal to the threshold value, obtain a predetermined value as the image difference value.

The first image frame and the second image frame may be two-dimensional monocular image frames.

The electronic apparatus may include a display, wherein the at least one processor may be further configured to: generate a virtual space image related to the second image frame based on the obtained final depth information, and control the display to display the virtual space image.

In accordance with an aspect of the disclosure, an image processing method of an electronic apparatus includes: obtaining second depth information of a second image frame that is subsequent to a first image frame; obtaining an image difference value between the first image frame and the second image frame; identifying a first weight corresponding to a first depth information and a second weight corresponding to a second depth information, wherein the first weight and the second weight are based on the obtained image difference value and a threshold value; obtaining final depth information corresponding to the second image frame by applying the first weight to the first depth information and applying the second weight to the second depth information; and generating, based on the obtained final depth information, an image related to the second image frame or transmitting the obtained final depth information to an external device.

The identifying the first weight and the second weight may include identifying the first weight and the second weight so that the second weight increases and the first weight decreases in proportion to the image difference value.

The obtaining the final depth information may include obtaining the final depth information by applying a third weight for Infinite Impulse Response (IIR) filtering to the first depth information to which the first weight is applied and applying a fourth weight for IIR filtering to the second depth information to which the second weight is applied.

The method may include segmenting the second image frame into a plurality of first regions; identifying a second region corresponding to each of the plurality of first regions in the first image frame; identifying a difference value between second regions corresponding to each of the plurality of first regions; and identifying at least one region of the plurality of first regions based on the identified difference value; wherein the identifying the first weight and the second weight may include identifying the first weight corresponding to the first depth information and the second weight corresponding to the second depth information based on the identified difference value and the threshold value for the identified at least one region.

In accordance with an aspect of the disclosure, a non-transitory computer readable medium storing computer instructions executed by a processor of an electronic apparatus storing information on an artificial intelligence model includes a plurality of layers to cause the electronic apparatus to perform operations including: obtaining second depth information of a second image frame that is subsequent to a first image frame; obtaining an image difference value between the first image frame and the second image frame; identifying a first weight corresponding to a first depth information and a second weight corresponding to a second depth information, wherein the first weight and the second weight are based on the obtained image difference value and a threshold value; obtaining final depth information corresponding to the second image frame by applying the first weight to the first depth information and applying the second weight to the second depth information; and generating, based on the obtained final depth information, an image related to the second image frame or transmitting the obtained final depth information to an external device.

In accordance with an aspect of the disclosure, an electronic apparatus includes: a memory configured to store instructions; at least one processor configured to execute the instructions to: obtain a first image frame and first depth information of the first image frame; obtain second depth information of a second image frame that is subsequent to the first image frame, obtain an image difference value between the first image frame and the second image frame, identify a first weight corresponding to the first depth information and a second weight corresponding to the second depth information, wherein the first weight and the second weight are based on the image difference value between the first image frame and the second image frame, obtain final depth information corresponding to the second image frame by applying the first weight to the first depth information and applying the second weight to the second depth information, and generate an image for the second image frame based on the obtained final depth information.

The at least one processor may be further configured to, based on a size of the image difference value being less than a preset value, obtain the final depth information corresponding to the second image frame.

The electronic apparatus may include a display, wherein the at least one processor may be further configured to control the display to display a virtual space image for the second image frame based on the obtained final depth information.

The at least one processor may be further configured to obtain the first depth information and the second depth information from an external device.

The at least one processor may be further configured to transmit the obtained final depth information to an external device.

DETAILED DESCRIPTION

Figure 1:
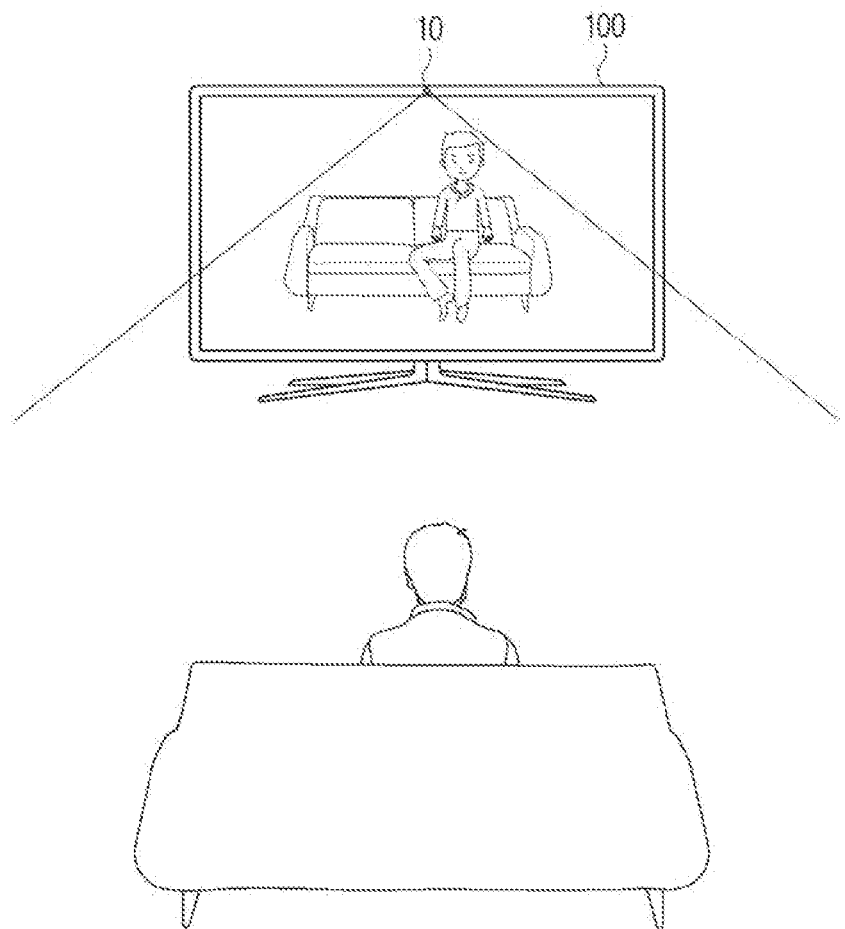
FIG. 1 is a diagram illustrating an implementation example of an electronic apparatus, according to an embodiment of the disclosure.

One or more embodiments will be described in greater detail below with reference to the accompanying drawings.

Terms used in the disclosure will be briefly described, and then the one or more embodiments will be described in detail.

The terms used in the disclosure and the claims are general terms identified in consideration of the functions of the various embodiments of the disclosure. However, these terms may vary depending on intention, technical interpretation, emergence of new technologies, and the like of those skilled in the related art. Unless there is a specific definition of a term, the term may be understood based on the overall contents and technological understanding of those skilled in the related art.

Terms such as "first," "second," and the like may be used to describe various components, but the components should not be limited by the terms. The terms are used to distinguish a component from another.

A singular expression includes a plural expression, unless otherwise specified. It is to be understood that the terms such as "comprise" or "consist of" are used herein to designate a presence of a characteristic, number, step, operation, element, component, or a combination thereof, and do not to preclude a presence or a possibility of adding one or more of other characteristics, numbers, steps, operations, elements, components or a combination thereof.

Expressions such as "at least one of A and/or B" and "at least one of A and B" and "at least one of A or B" should be understood to represent "A," "B" or "A and B." Expressions such as "at least one of A, B, or C" and "at least one of A, B, and C" should be understood to represent only A, only B, only C, both A and b, both A and C, both B and C, all of A, B, and C, or any variations thereof.

Terms such as "module," "unit," "part," and so on may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and may be realized in at least one processor.

Hereinafter, non-limiting embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted, and similar portions will be denoted by similar reference numerals throughout the specification.

FIG. 1 is a diagram illustrating an implementation example of an electronic apparatus, according to an embodiment of the disclosure.

An electronic apparatus 100 may be implemented as a television (TV) as illustiated in FIG. 1, but is not limited thereto, and according to one or more embodiments, the electronic apparatus 100 may be implemented as a server, a set-top box, smartphone, a tablet personal computer (PC), a notebook PC, a head mounted display (HMD), a near eye display (NED), a camera, a camcorder, a large format display (LFD), a digital signage, a digital information display (DID), a video wall, a projector display, or the like, having an image processing function.

The electronic apparatus 100 may obtain depth information (or a depth value, depth estimation information, and a depth estimation value) based on the input image, and generate various types of images based on the obtained depth information. In general, depth information indicates three-dimensional distance information of an object existing in an image, and may be assigned to each pixel of an image. For example, an 8-bit depth may have a gray scale value of 0 to 255. For example, when expressed on a black/white, a black (low value) represents a place far from a viewer, and a white (high value) may represent a place close to the viewer.

The input image may be received from an external device (for example, a device having a camera) or a 2D image captured by a camera provided in the electronic apparatus 100. According to an embodiment, the electronic apparatus 100 may obtain depth information from a 2D image and generate a virtual space image based on the obtained depth information. For example, when the electronic apparatus 100 is implemented as a server, depth information may be obtained from a 2D image received from an external device, and a virtual space image (or a metaverse image) may be generated based on the obtained depth information. According to another example, the electronic apparatus 100 may transmit depth information obtained from the obtained 2D image to an external device and generate a virtual space image in the external device. For example, when the electronic apparatus 100 is implemented as a device having a camera such as a TV, depth information may be obtained from a 2D image obtained through a camera, and the obtained depth information may be transmitted to an external device such as a server. Here, the virtual space refers to a three-dimensional virtual world in which a social, economic and culture activity like a real world is performed, and the virtual space image may be a three-dimensional virtual world image. The depth information obtained from the 2D image may be used to express various objects included in the virtual space image, for example, a stereoscopic effect of a building, furniture, a sculpture, an object, nature, etc., or represent a three-dimensional effect of an avatar replacing a user.

According to an embodiment, the electronic apparatus 100 is implemented as a TV including a camera 10 as illustrated in FIG. 1. In this case, the electronic apparatus 100 may obtain depth information based on a 2D image obtained through the camera 10, generate a virtual space image based on the obtained depth information, or transmit the obtained depth information to an external device.

Meanwhile, a technology for estimating depth information in a current 2D image is an optimized technology for predicting a depth value based on one 2D image frame. When a depth value for a video is predicted, a reference value is not present, and a predicted depth value at the same position is differently predicted between consecutive frames so that a flicker is generated. When most objects in the image are fixed, the depth value is kept constant, but when there are many regions moving in the image, a large flicker occurs in the surrounding depth estimation value. In order to reduce such a problem, a method for training a continuous image together with GT data may be used by using a Long Short Term Memory (LSTM) or a 3D DNN. However, in order to achieve this, there is a problem in that image data having a huge amount of depth information needs to be developed, and a model capable of optimally learning is required, so that a lot of time and costs are required Accordingly, various embodiments capable of obtaining accurate depth information from a 2D image by using a simple image processing technology without having high costs will be described.

Figure 2:
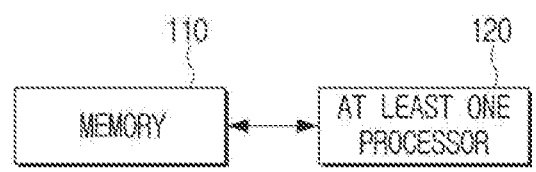
FIG. 2 is a block diagram illustrating a configuration of an electronic apparatus, according to an embodiment of the disclosure.

FIG. 2 is a block diagram illustrating a configuration of an electronic apparatus, according to an embodiment of the disclosure.

Referring to FIG. 2, the electronic apparatus 100 includes a memory 110 and a processor 120.

The memory 110 may be electrically connected to the processor 120 and may store data necessary for various embodiments of the disclosure. The memory 110 may be implemented as a memory embedded in the electronic apparatus 100, or may be implemented as a removable or modular memory in the electronic apparatus 100, according to the data usage purpose. For example, data for driving the electronic apparatus 100 may be stored in a memory embedded in the electronic apparatus 100, and data for an additional function of the electronic apparatus 100 may be stored in the memory detachable to the electronic apparatus 100. A memory embedded in the electronic apparatus 100 may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD), or the like. In the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multimedia card (MMC), etc.), an external memory (for example, a USB memory) connectable to the USB port, or the like, but the memory is not limited thereto.

According to an embodiment, the memory 110 may store at least one instruction for controlling the electronic apparatus 100 or a computer program including instructions.

According to an embodiment, the memory 110 may store an image, that is, an input image, received from an external device (for example, a source device), an external storage medium (for example, universal serial bus (USB), external server (for example, a web hard). The memory 110 may store an image obtained through a camera provided in the electronic apparatus 100. Herein, the image may be a digital moving image or a still image, but the image is not limited thereto.

According to another example, the memory 110 may store information, an algorithm, an image quality parameter, and the like for performing at least one of various information necessary for image quality processing, for example, at least one of Noise Reduction, Detail Enhancement, Tone Mapping, Contrast Enhancement, Color Enhancement, or Frame rate Conversion. In addition, the memory 110 may store an image generated based on an intermediate image and depth information generated by image processing.

According to an embodiment, the memory 110 may be implemented as a single memory for storing data generated in various operations according to the disclosure. However, according to an embodiment, the memory 110 may be implemented to include a plurality of memories each storing different types of data or storing data generated in different stages, respectively.

In the above-described embodiment, it has been described that various data is stored in the external memory 110 of the processor 120, but at least some of the above-described data may be stored in an internal memory of the processor 120 according to an implementation example of at least one of the electronic apparatus 100 or the processor 120.

At least one processor 120 (hereinafter, a processor) is electrically connected to the memory 110 to control the overall operation of the electronic apparatus 100. The at least one processor 120 may be composed of one or a plurality of processors. Here, the one or more processors may be implemented by at least one software or at least one hardware or a combination of at least one software and at least one hardware. According to an embodiment, software or hardware logic corresponding to at least one processor may be implemented in one chip. According to another example, software or hardware logic corresponding to a part of a plurality of processors may be implemented in one chip, and software or hardware logic corresponding to the rest may be implemented in another chip.

Specifically, the processor 120 may perform an operation of the electronic apparatus 100 according to various embodiments of the disclosure by executing at least one instruction stored in the memory 110.

The processor 120 according to an embodiment may be implemented with, for example, and without limitation, a digital signal processor (DSP) for image-processing of a digital image signal, a microprocessor, a graphics processor (GPU), an AI (AI) processor, a neural processor (NPU), a time controller (TCON), or the like, but the processor is not limited thereto. The processor 120 may include, for example, and without limitation, one or more among a central processor (CPU), a micro controller unit (MCU), a micro processor (MPU), a controller, an application processor (AP), a communication processor (CP), an advanced reduced instruction set computing (RISC) machine (ARM) processor, a dedicated processor, or may be defined as a corresponding term. The processor 120 may be implemented in a system on chip (SoC) type or a large scale integration (LSI) type which a processing algorithm is built therein, application specific integrated circuit (ASIC), or in a field programmable gate array (FPGA) type.

Further, the processor 120 for executing the AI model according to an example embodiment may be a general-purpose processor such as a central processor (CPU), an application processor (AP), a digital signal processor (DSP), a dedicated processor, or the like, a graphics-only processor such as a graphics processor (GPU), a vision processing unit (VPU), an AI-only processor such as a neural network processor (NPU), or the like, but the processor is not limited thereto. The processor 120 may control processing of the input data according to a predefined operating rule or AI model stored in the memory 110. If the processor 120 is an AI-only processor, the processor 120 may be designed with a hardware structure specialized for the processing of a particular AI model. For example, hardware specific to the processing of a particular AI model may be designed into a hardware chip, such as an application specific integrated circuit (ASIC), a field programmable gate array (FPGA), or the like. When the processor 120 is implemented as a dedicated processor, the processor 120 may be implemented to include a memory for implementing an embodiment of the disclosure or may be implemented to include a memory processing function for using an external memory.

The processor 120 may obtain depth information from an input image. Here, the input image may include a still image, a plurality of consecutive still images (or frames), or a video. For example, the input image may be a 2D image. The depth information may be in the form of a depth map. A depth map refers to a table including depth information for each region of an image. The region may be divided into pixel units or may be defined as a predetermined region larger than the pixel unit. According to an embodiment, a depth map may have a format that with 127 or 129 among grayscale values of 0 to 255 as a reference value, that is 0 (or focal plane), a value smaller than 127 or 128 is indicated as a minus (−) value and a value greater than 127 or 128 is indicated as a plus (+) value. The reference value of the focal plane may be arbitrarily selected between 0 and 255. Here, the − value means recess, and the + value means a protrusion. However, this is merely an example, and the depth map may express a depth with various values according to various criteria.

According to an embodiment, the processor 120 may obtain depth information based on the image-processed image after image-processing the input image. The image processing may include at least one of image enhancement, image restoration, image transformation, image analysis, image understanding, image compression, image decoding, or scaling. According to an embodiment, when the electronic apparatus 100 is implemented to include a video wall display including a plurality of display modules, an operation according to various embodiments of the disclosure may be performed by a main processor (or an image processing device including a main processor) included in a master display module for processing an input image. In this case, the processor 120 may divide the obtained output image into an image region to be displayed in each of the plurality of display modules, and transmit an image corresponding to each image region to a corresponding display module. For example, when a plurality of display modules are connected in a daisy chain communication method, an image corresponding to each image region may be transmitted through a corresponding communication method.

According to an embodiment, various preprocessing may be performed before obtaining depth information for an input image, but for convenience of description, the input image and the preprocessed image are not distinguished, and is referred to as an input image.

The processor 120 may store a first image frame included in an input image and first depth information corresponding to the first image frame in the memory 110. According to an embodiment, when a first image frame is input, the processor 120 may obtain first depth information while pre-processing and/or post-processing the first image frame and store the first depth information in the memory 110. Here, the first image frame and the second image frame to be described below may be a 2D monocular image frame.

According to an example, the processor 120 may obtain depth information of a first image frame based on various image processing methods, for example, an algorithm, a formula, an artificial intelligence model, and the like.

Figure 3A:
FIGS. 3A and 3B are diagrams illustrating a method of obtaining depth information using an artificial intelligence model, according to an embodiment of the disclosure.
Figure 3B:
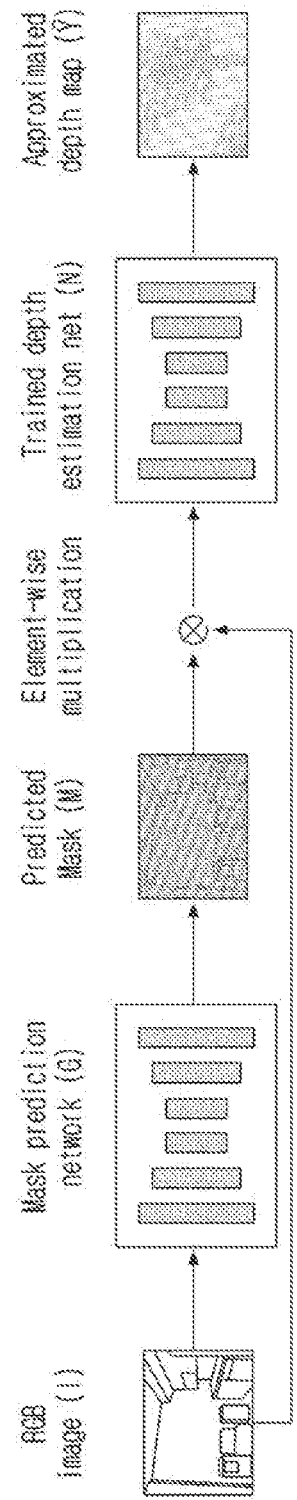

FIGS. 3A and 3B are diagrams illustrating a method of obtaining depth information using an artificial intelligence model according to an embodiment of the disclosure.

According to an embodiment, the artificial intelligence model may be implemented as a neural network including a plurality of neural network layers. The artificial intelligence model may be implemented as, but is not limited to, a deep neural network (DNN), a convolutional neural network (CNN), a recurrent neural network (RNN), a restricted national Boltzmann machine (RBM), a deep beliefnetwork (DBN), a bidirectional recurrent deep neural network (BRDNN), or a deep Q-networks. The artificial intelligence model may be pre-trained to output depth information when an image is input. Here, the learning of the artificial intelligence model means that a basic artificial intelligence model (for example, an artificial intelligence model including any random parameter) is learned by using a plurality of training data by a learning algorithm, thereby producing a predefined operation rule or artificial intelligence model configured to perform a desired characteristic (or target). The learning may be performed through a separate server and/or system, but is not limited thereto, and may be performed by an electronic apparatus. Examples of the learning algorithm include, but are not limited to, supervised learning, unsupervised learning, semi-supervised learning, or reinforcement learning. FIG. 3B illustrates an example of a DNN model trained to output depth information. However, the DNN model illustrated in FIG. 3B is an example, and various artificial intelligence models trained to output depth information may be applied to the disclosure.

According to FIG. 3A, when an image (for example, a first image frame) is input, the processor 120 may pre-process the input image at operation 311. Here, the preprocessing may refer to processing an image so that an artificial intelligence model 312 can perform inference, and may include, for example, processing of image size adjustment, color area change, image accumulation, and the like. However, embodiments are not limited thereto, and various preprocessing technologies may be applied according to the type, structure, capacity, and the like of the artificial intelligence model 312.

The preprocessed input image may be input to the artificial intelligence model 312 and processed (for example, inference). For example, an image input to the artificial intelligence model 312 may be processed by simultaneously utilizing a software platform such as TFLite, Pytorch, and H/W platform such as a GPU or a TPU.

An output value of the artificial intelligence model 312 may be post-processed. For example, various processing required for a final end, such as softmax, maxlocation, roi conversion, etc., may be processed in the platform in an inference process of the artificial intelligence model, or the processor 120 may post-process the DNN result value directly. The processor 120 may obtain depth information of an image based on a post-processing result.

When a second image frame subsequent to the first image frame is input, the processor 120 may process the second image frame according to various embodiments to obtain depth information of the second image frame.

Various embodiments in which the processor 120 obtains depth information (hereinafter, referred to as final depth information) of a second image frame will be described below with reference to the drawings.

Figure 4:
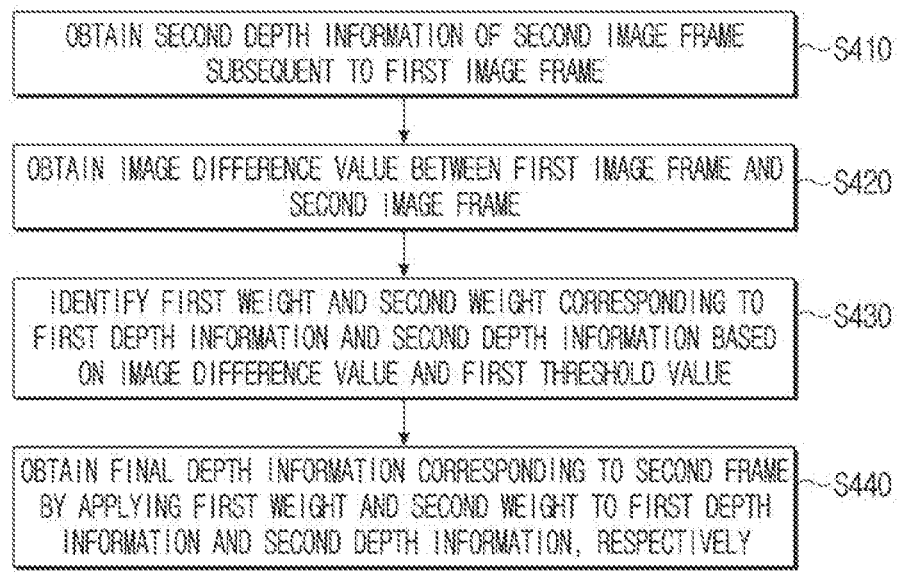
FIG. 4 is a flowchart illustrating a method of image processing, according to an embodiment of the disclosure.

FIG. 4 is a flowchart illustrating a method of image processing, according to an embodiment of the disclosure.

According to FIG. 4, the processor 120 obtains second depth information from a second image frame after the first image frame in operation S310, according to an embodiment. In this case, the processor may obtain second depth information in the same/similar manner as the first image frame. Here, when the second image frame is a current frame, the first image frame may be a previous frame temporally consecutive to the second image frame.

The processor 120 may obtain an image difference value of the first image frame and the second image frame in operation S320. When the first image frame is a first frame to which the first image frame is input, an image difference value corresponding to the first image frame may be obtained based on a pre-stored reference frame, pre-stored depth information, and the like. However, embodiments are not limited thereto, and an image difference value may be calculated from the second frame.

The image difference value may be obtained based on a difference in red (R)/green (G)/blue (B) pixel values, or may be obtained based on optical flow information. However, in some cases, if other pixels except for R/G/B are included (for example, a white pixel), a corresponding pixel value may also be used to calculate an image difference value. For example, in the case of an 8-bit image, a pixel value may be a value between 0 and 255.

According to an embodiment, the processor 120 may obtain a pixel difference value between a plurality of first pixel regions included in a first image frame and a plurality of second pixel regions included in a second image frame, and obtain an image difference value based on the pixel difference value. Here, the pixel region may mean at least one pixel block or a set of pixel blocks. In addition, a pixel block may refer to a set of at least one pixel or adjacent pixels including at least one pixel.

For example, the processor 120 may obtain an image difference value by calculating a difference in R/G/B pixel values between pixel regions included in the first and second image frames, respectively. Specifically, when the pixel data of the position (X, Y) in the first image frame is $P1_{x,y}=(R1_{x,y}, G1_{x,y}, B1_{x,y})$, and the pixel data of the position (X, Y) in the second image frame is $P2_{x,y}=(R2_{x,y}, G2_{x,y}, B2_{x,y})$, the image difference value may be obtained by simply averaging ((R+G+B)/3) or minMax average ((max(R,G,B)+min(R,G,B))/2)). In this case, the difference (ABS($P2_{x,y}-P1_{x,y}$)=(ABS($R2_{x,y}-R1_{x,y}$), ABS($G2_{x,y}-G1_{x,y}$), ABS($B2_{x,y}-B1_{x,y}$))) between corresponding R/G/B/pixel data may be used. Here, the ABS may refer to an absolute value. Alternatively, the processor 120 may obtain an image difference value by converting an R/G/B pixel value difference between pixel regions included in the first and second image frames into luminance.

As a first example, the processor 120 may calculate an image difference value based on a simple average of a three-channel value, for example, an RGB value, such as Equation 1 below.

$$D-T_{x,y}=(ABS(R2x,y-R1x,y)+ABS(G2x,y-G1x,y)+ABS(B2x,y-B1x,y))/3 \quad \text{[Equation 1]}$$

As a second example, the processor 120 may calculate an image difference value based on minMax average as shown in Equation 2 below.

Here, $D-T_{x,y}$ indicates an image difference value at a (x, y) pixel position.

$$D-T_{x,y}=(\max(ABS(R2x,y-R1x,y),ABS(G2x,y-G1x,y), ABS(B2x,y-B1x,y))+\min((ABS(R2x,y-R1x,y), ABS(G2x,y-G1x,y),ABS(B2x,y-B1x,y))/2 \quad \text{[Equation 2]}$$

As a third example, the processor 120 may calculate an image difference value based on luminance as shown in Equation 3 below.

$$D-T_{x,y}=0.299\ ABS(R2x,y-R1x,y)+0.587\ ABS(G2x,y-G1x,y)+0.114\ ABS(B2x,y-B1x,y) \quad \text{[Equation 3]}$$

Here, 0.299, 0.587, 0.114 may be constants defined in a well-known equation for relative luminance. However, this is merely an example, and various algorithms for changing the RGB value to the luminous may be applied.

In another example, the processor 120 may obtain an image difference value based on a difference between pixel regions corresponding to the first channel after changing the R/G/B 3 channels into a 1 channel. Even in this case, a simple average, minMax average, and luminance may be used.

As the first example, the processor 120 may calculate an image difference value based on a simple average of 1 channel value like Equation 4 below.

$$D-T_{x,y}=ABS(P2x,y-P1x,y)$$

$$P1x,y=(R1x,y+G1x,y+B1x,y)/3, P2x,y=(R2x,y+G2x,y+B2x,y)/3 \quad \text{[Equation 4]}$$

As the second example, the processor 120 may calculate an image difference value based on minMax average like Equation 5 below.

$$D-T_{x,y}=ABS(P2x,y-P1x,y)$$

$$P1x,y=(\max(R15x,y,G1x,y,B1x,y)+\min(R1x,y,G1x,y,B1x,y))^2,$$

$$P2x,y=(\max(R2x,y,G2x,y,B2x,y)+\min(R2x,y,G2x,y,B2x,y))/2 \quad \text{[Equation 5]}$$

As the third example, the processor 120 may calculate an image difference value based on luminance like Equation 6 below.

$$D-T_{x,y}=ABS(P2x,y-P1x,y)$$

$$P1x,y=0.299R1x,y+0.57G1x,y+0.114B1x,y=0.299R2x,y+0.587G2x,y+0.114B2x,y \quad \text{[Equation 6]}$$

According to an embodiment, the processor 120 may obtain an image difference value based on optical flow information obtained from a first image frame and a second image frame. The optical flow is a technology for tracking the position of each pixel in continuous image data on a time axis, and the movement path of each pixel in a plurality of consecutive frames may be predicted. According to an embodiment, the optical flow may be obtained by using a deep learning network. For example, a deep learning network such as FlowNet may be used, but is not limited thereto. Specifically, a feature may be extracted through a convolution layer and refined to predict an optical flow map. In this case, a method of performing learning may be used by comparing a predicted value and a correct answer image by using a plurality of frames as an input.

According to an example, the processor 120 may identify a first weight and a second weight corresponding to first depth information and second depth information based on the obtained image difference value in operation S430. According to an example, identifying a first weight and a second weight comprises identifying the first weight and the second weight so that the second weight increases and the first weight decreases in proportion to the image difference value. That is, when the image difference value is large, the processor 120 may determine the weight so that the weight of the second image frame, that is, the current frame, is relatively large and when the image difference value is small, the weight of the first image frame, that is, the previous frame, is relatively large. According to an embodiment, when a second weight value is set to 1 and a first weight value is set to 0, because the image difference value is very large, the processor 120 identifies second depth information of the current frame, for example, depth information obtained by inputting the current frame to the artificial intelligence model as the final depth information of the current frame.

According to an example, the processor 120 may obtain final depth information of the second image frame based on Equation 7 below.

$$RE_{x,y}=(D_{x,y}/255)*RT_{x,y}(1-D_{x,y}/255)*RP_{x,y} \quad \text{[Equation 7]}$$

$RE_{x,y}$ refers to depth estimation value at X, Y positions, $D_{x,y}$ refers to an image difference, $RP_{x,y}$ refers to a depth value of a previous frame, and $RT_{x,y}$ refers to a depth value of a current frame. Here, the image difference $D_{x,y}$ may have a value of 0 to 255 with respect to 8 bit unsigned int, but is not limited thereto.

When the weight is adjusted based on the size of the image difference value, the depth prediction value of the previous frame may be continuously used when the image difference between the adjacent frames is not large, thereby reducing flicker according to the depth prediction value.

According to another example, the processor 120 may identify a first weight and a second weight corresponding to the first depth information and the second depth information based on the obtained image difference value and the first threshold value in operation S430.

Specifically, the processor 120 may use the obtained image difference value when the obtained image difference value is greater than a first threshold value and use a predetermined value as an image difference value when the obtained image difference value is less than the first threshold value. This is to reflect various errors including errors due to camera noise and the like. Here, the predetermined value may include 0, but is not limited thereto, and the value may be set to a value obtained through an experiment.

For example, based on Equation 8 below, the image difference value D_THR$_{x,y}$ based on the first threshold value (thr 1) may be obtained.

$$D\text{-}THR_{x,y} = \text{Thresholding}(D\text{-}T_{x,y}, \text{thr}1) \quad \text{[Equation 8]}$$

Here, D_T$_{x,y}$ is the depth value of the current frame. For example, the "thresholding" function may be, but is not limited to, a function that if D-T$_{x,y}$>thr 1, a resulting value is of D-T$_{x,y}$, or otherwise 0. In Equation 8, when the image difference value is less than or equal to the first threshold value, the predetermined value is assumed to be 0, but a predetermined value is not necessarily limited thereto. If the predetermined value is set to 0, the processor 120 may obtain a final image difference value by using the first weight and the second weight only when the image difference value is greater than the first threshold value.

According to an embodiment, the processor 120 may obtain an image difference value based on a second threshold value in order to apply a stronger gain to an image difference value in which an error due to noise or the like is reflected. According to an embodiment, if an image difference value obtained by the above-described method is greater than a second threshold value, a predetermined value is used as an image difference value, and if the image difference value is less than or equal to a second threshold value, an image difference value obtained by various methods described above may be used. Here, the applied second threshold value may refer to a threshold value different from the first threshold value used in Equation 8. For example, an image difference value D$_{x,y}$ based on a second threshold value may be obtained based on Equation 9 below.

$$Dx,y = \text{Thresholding}(D\text{-}T_{x,y}, \text{thr}2) \quad \text{[Equation 9]}$$

Here, the "thresholding" function may be, but is not limited to, a function that if D-T$_{x,y}$>thr 2, a result value is a predetermined value, for example, 255, or otherwise D-T$_{x,y}$. However, in the case where spatial spreading according to Equation 11 (or Equation 12) is applied, D-T$_{x,y}$ may be replaced with D-S$_{x,y}$.

The processor 120 may obtain final depth information corresponding to the second image frame by applying the obtained first weight and second weight to the first depth information and the second depth information in operation S440. Subsequently, the processor 120 may generate an image related to the second image frame or transmit the obtained final depth information to the external device based on the obtained final depth information.

Figure 5:
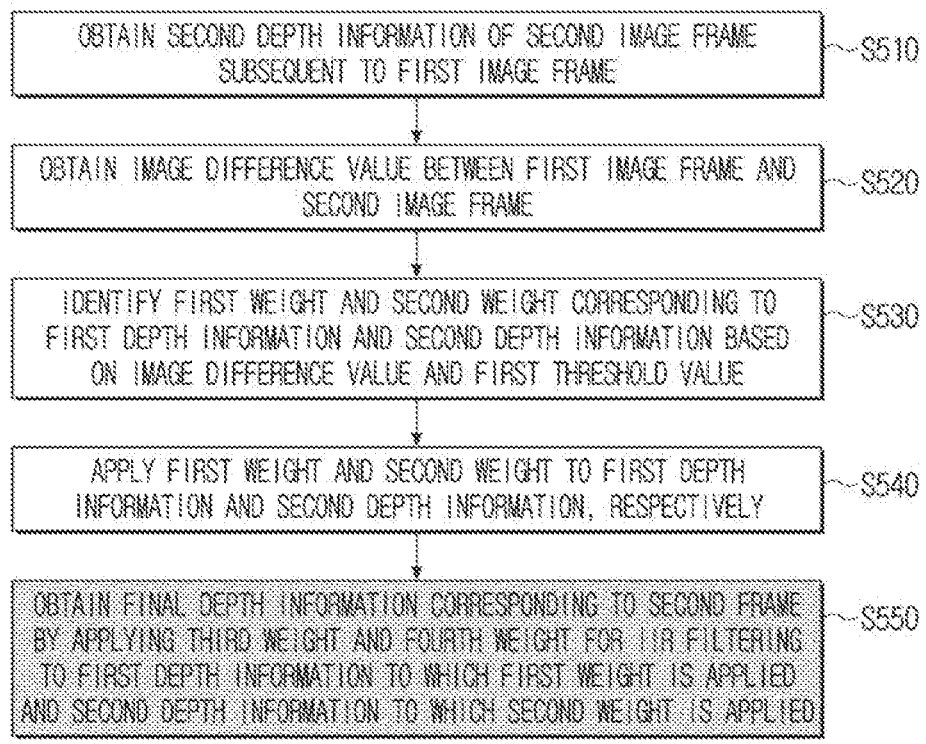
FIG. 5 is a flowchart illustrating a method of image processing, according to an embodiment of the disclosure.

FIG. 5 is a flowchart illustrating a method of image processing, according to an embodiment of the disclosure.

The operations S510 to S540 among the processes of FIG. 5 are similar or same as S410 to S440 of FIG. 4, and a duplicate description is omitted.

Because the depth information of the previous frame and the depth information of the current frame are calculated in units of at least one pixel, a jitter may be locally generated when the depth information value between adjacent pixels is large. Accordingly, in FIG. 5, final depth information of a current frame may be calculated by applying filtering to prevent such jitter, for example, IIR filtering.

As illustrated in FIG. 5, according to an embodiment, the processor 120 may obtain the final depth information comprises obtaining the final depth information by applying a third weight and a fourth weight for Infinite Impulse Response (IIR) filtering to the first depth information to which the first weight is applied and the second depth information to which the second weight is applied, respectively.

According to an example, the processor 120 may obtain final depth information of the second image frame based on Equation 10 below.

$$R_{x,y} = w1 * RE_{x,y} + w2 * RP_{x,y} \quad \text{[Equation 10]}$$

Here, R$_{x,y}$ may refer to a final depth prediction value. w1 and w2 are weight values determined based on an Infinite Impulse Response (IIR) filtering scheme, and the sum of w1 and w2 may be 1. As discussed above, RE$_{x,y}$ refers to depth estimation value at X, Y positions, and RP$_{x,y}$ refers to a depth value of a previous frame.

When the filtering such is used, the depth information of the second image frame may be maintained in a relatively stable state.

However, when the weight for filtering (i.e., the weight of Equation 10) is applied, the weight of Equation 10 is not necessarily applied after the weight of Equation 7 is applied. For example, the weight may be used as a gain type in a weight value of Equation 7, that is, a weight of Equation 7 may be modified.

FIGS. 6, 7A, 7B, and 7C are diagrams illustrating a method of image processing, according to one or more embodiments of the disclosure.

Figure 6:
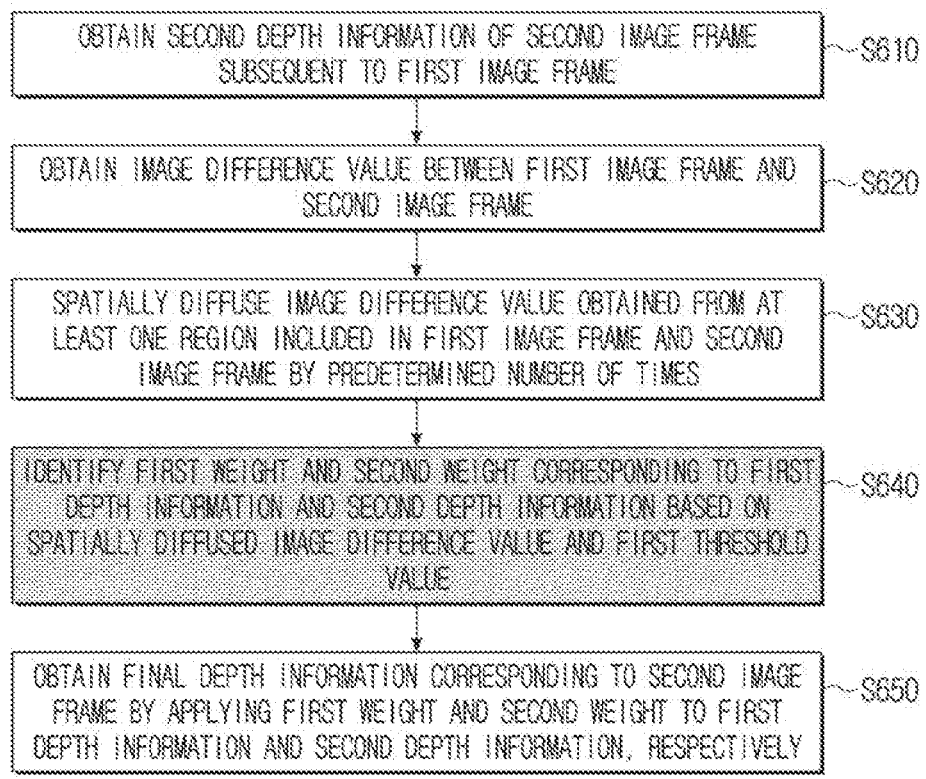
FIGS. 6, 7A, 7B, and 7C are diagrams illustrating a method of image processing, according to one or more embodiments of the disclosure.

The operations S610 to S620 among the processes of FIG. 6 are similar or same as S410 to S420 of FIG. 4, and a duplicate description is omitted.

According to an embodiment, the processor 120 may spatially diffuse an image difference value obtained in at least one region included in a first image frame and a second image frame a predetermined number of times, and may identify a first weight and a second weight corresponding to the first depth information and the second depth information based on the spatially diffused image difference value and the first threshold value. For example, the processor 120 may spread the image difference value by using a dilate morphology, blurring, or the like.

Figure 7A:
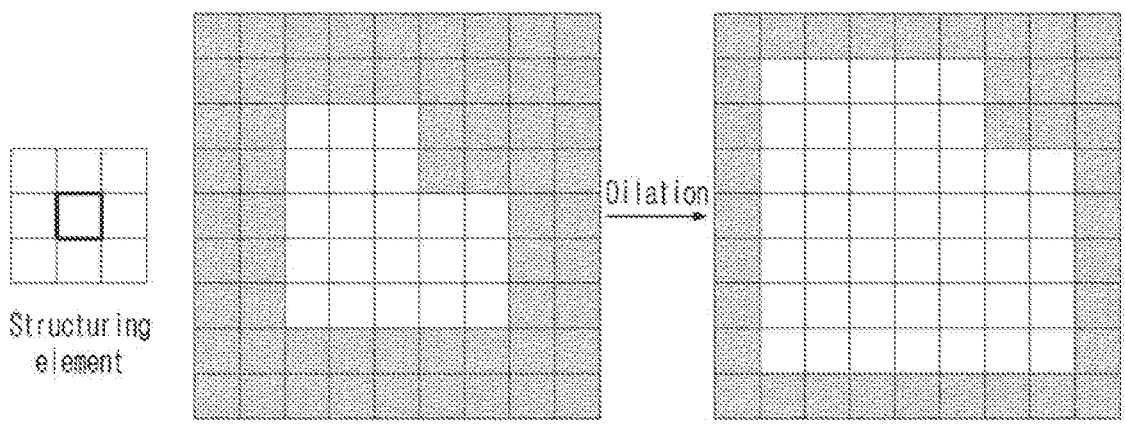
Figure 7B:
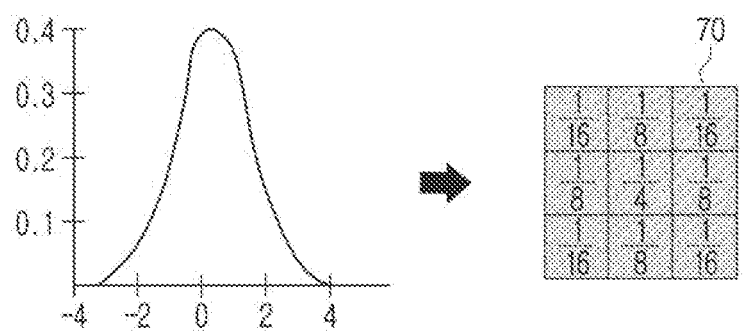
Figure 7C:
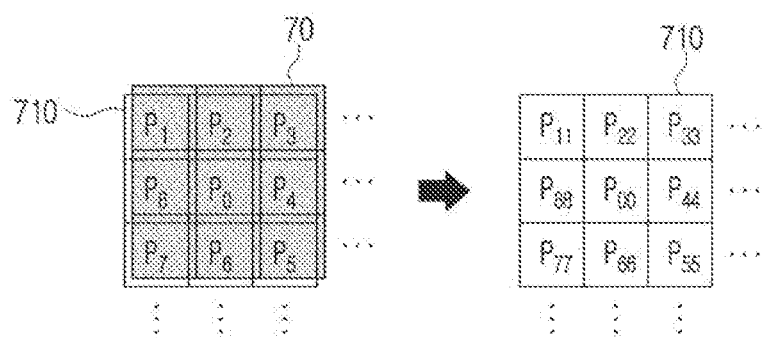

FIG. 7A is a diagram illustrating an example of dilate morphology processing, and FIG. 7B and FIG. 7C are diagrams illustrating an example of blurring, according to one or more embodiments.

The processor 120 may expand a region in which an image difference value is generated through a dilate morphology process. For example, according to an embodiment, the processor 120 may repeat extension processing multiple times by using a structuring element as shown in FIG. 7A to perform the dilate morphology process.

The processor 120 may expand a region in which an image difference value is generated through a blurring process. For example, the processor 120 may perform a blurring processing by using a Gaussian filter. Here, as shown in FIG. 7B, the Gaussian distribution may have a format in which a weight value of 0 in the x-axis is large and a weight decreases toward the +/− portion, and when the Gaussian distribution is applied to the 3*3 mask 70, the center of the mask 70 may have a format that the center has a high weight, and the weight may become less toward the edge of the mask 70. However, the numerical value shown in FIG. 7B is an example, and the filtering value is changed according to the sigma value of the Gaussian function. The processor 120 may perform blurring processing by applying the Gaussian mask 70 to an image difference region in which an image difference greater than or equal to a threshold value is generated. In general, a Gaussian filter is used as a filter for removing noise generated by normal distribution and probability distribution through smoothing, but in an embodiment, an image difference region is smoothed to expand a target region to a peripheral pixel region including a pixel in which an image difference is generated.

When it is determined that there is no image difference value even though the size of the generated region of the image difference value is small or due to the same color, it is possible to continuously accumulate the depth information of the previous image frame. Accordingly, the processor 120 may solve such a problem by applying the logic spatially diffusing the image difference value, according to an embodiment.

According to an example, the processor 120 may obtain an image difference value to which spatial spread is applied, based on Equation 11 and/or Equation 12 below. According to an embodiment, a dilate morphology processing may be performed based on Equation 11, or a blurring processing may be performed based on Equation 12.

$$D\text{-}S_{x,y}=\text{Dilate}(D\text{-}THR_{x,y},\text{tap}=50) \quad \text{[Equation 11]}$$

Here, "dilate" refers to a dilate morphology processing function, and "tap" refers to the number of repetitions of an extension. Although the tap is set to 50 in Equation 11, this is only an example, and the number of taps may be variously changed based on the size of the source region, the size of the diffusion target region, and the like.

$$D\text{-}S_{x,y}=\text{Blur}(D\text{-}THR_{x,y},\text{tap}=101) \quad \text{[Equation 12]}$$

Here, Blur denotes a blurring processing function, and tap denotes the number of repetitions of blurring. Although the tap is set to 101 in Equation 11, this is only an example, and the number of taps may be variously changed based on the size of the source region, the size of the diffusion target region, and the like.

In Equation 11 and 12, $D\text{-}THR_{x,y}$ may be an image difference value to which a first threshold value is applied according to Equation 8 or an image difference value to which a second threshold value is applied according to Equation 9. However, according to an embodiment, when the first threshold value, the second threshold value, and the like are not applied, the value may be replaced with values such as $RE_{x,y}$ calculated in Equation 7.

The spread logic may be selectively applied according to a method for calculating an image difference (for example, pixel difference-based, optical flow-based), and a type of an application. For example, when an image difference is calculated using a DNN-based optical flow, only a portion in which actual motion has occurred may be relatively accurately distinguished, and thus diffusion logic may not be used. Alternatively, it is also possible to use a method of resetting and using depth information of a previous frame accumulated after a predetermined time, not a spreading logic, depending on an application.

When an image difference value through spatial spreading is obtained in the manner described above, the processor 120 may identify a first weight and a second weight corresponding to the first depth information and the second depth information based on the obtained image difference value and the first threshold value in operation S640.

The processor 120 may obtain final depth information corresponding to the second image frame by applying the first weight and the second weight to the first depth information and the second depth information, respectively in operation S650. The steps S640 and S650 are the same as or similar to the steps S430 and S440 described with reference to FIG. 4, and thus a detailed description thereof is omitted.

FIGS. 8, 9A, 9B, and 9C are diagrams illustrating a method of image processing, according to an embodiment of the disclosure.

According to an embodiment, the processor 120 may identify at least one region of the second image frame and obtain depth information reflecting the image difference according to an embodiment of the disclosure only for the identified region.

Figure 8:
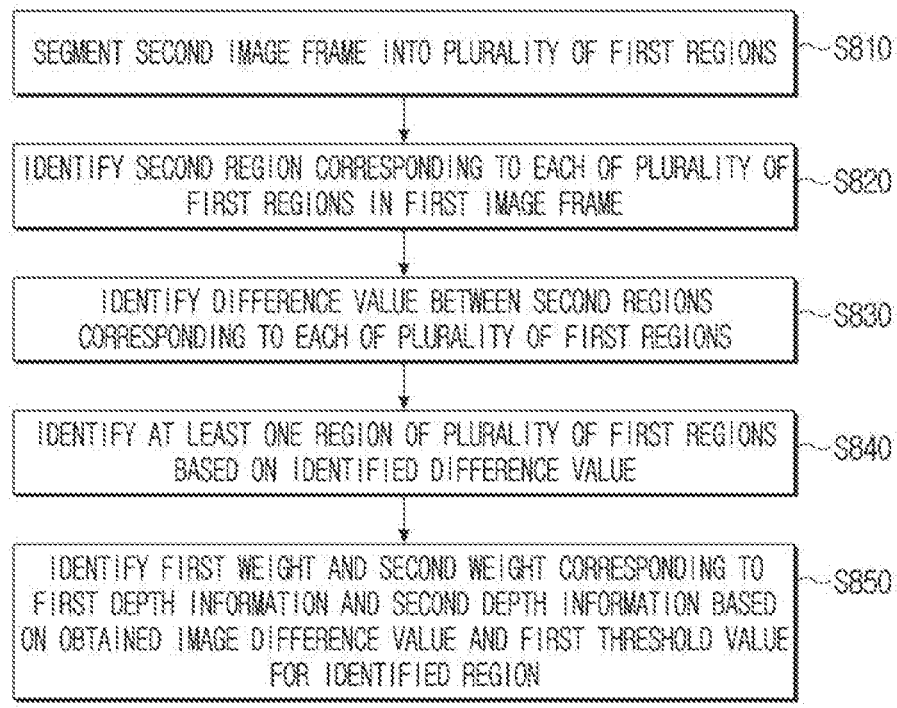
FIGS. 8, 9A, 9B, and 9C are diagrams illustrating a method of image processing, according to one or more embodiments of the disclosure.

As illustrated in the flowchart in FIG. 8, according to an embodiment, the processor 120 may segment the second image frame into a plurality of second regions in operation S810. In this case, the processor 120 may segment the second image frame into a plurality of second regions based on a depth value for each pixel region included in the second image frame. Alternatively, the processor 120 may segment the second image frame into a plurality of second regions based on pixel values for each pixel region included in the second image frame.

Figure 9A:
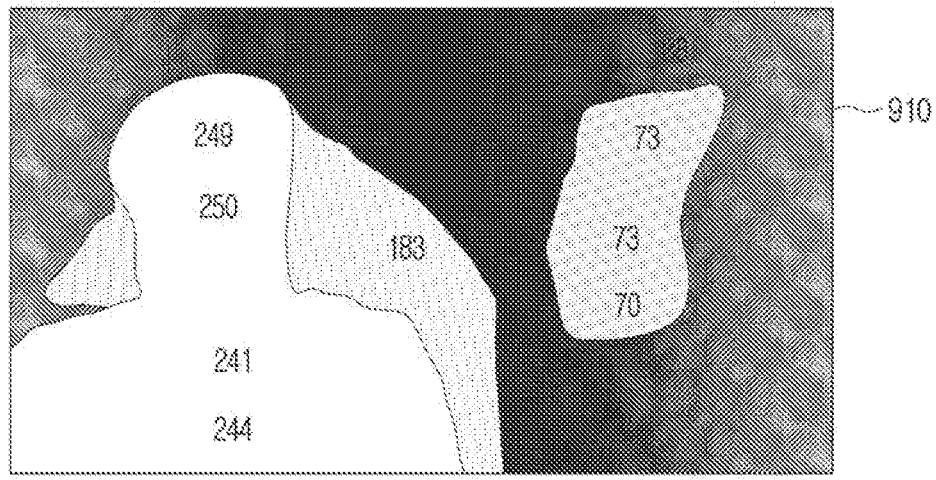
Figure 9B:
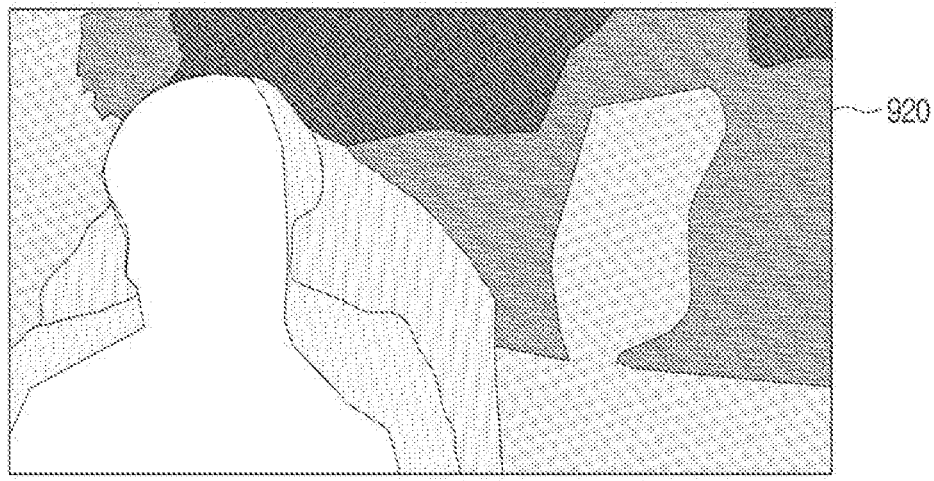

According to an example, as illustrated by image 910 in FIG. 9A, the same object may have a similar depth value. The numbers in FIG. 9A (e.g., 38, 70, 73, 183, 241, 244, 250) refer to depth values. Here, the second image frame may be identified as a plurality of second regions, that is, a plurality of segmentation groups by applying a segmentation technology (e.g., a K-means clustering algorithm). A k-means clustering algorithm is an algorithm that binds given data into k clusters and operates in a manner that minimizes the variance of the distance difference with each cluster. The algorithm is a type of autonomous learning, and performs a role of attaching a label to input data not having a label. The algorithm has a structure similar to that of clustering using an EM algorithm. FIG. 9B illustrates an example of identifying a large segmentation group by applying a K-means algorithm to a depth value included in a current frame, that is, a second image frame 920.

Segmentation based on a depth value is an example, and the second image frame may be segmented into a plurality of second regions by applying various methods, such as color clustering, a pixel value-based object classification method, a region-of-interest (ROI) identification method, and the like.

Subsequently, the processor 120 may identify a first region corresponding to each of a plurality of second regions in the first image frame in operation S820. For example, the processor 120 may identify a plurality of first regions including pixels corresponding to positions (e.g., coordinate information) of pixels included in each of the plurality of second regions in a second image frame.

A difference value (or a change amount) between second regions corresponding to each of the plurality of first regions may be identified in operation S830. Here, a difference value (or a change amount) between the first region and the second region may be obtained based on a difference value between pixels included in the first region and the corresponding second region. For example, a difference value may be obtained based on an average value of R/G/B pixel difference values of corresponding pixels included in the first region and the second region. For example, the difference value between the regions may be obtained by summing the absolute values of R/G/B pixel difference values of corresponding pixels included in the first region and the second region, and then dividing the sum by 3.

According to an embodiment, a plurality of first regions and a plurality of second regions are defined as S=[S1, S2, S3, . . . Sn]. In this case, a pixel belonging to each of the S1, S2, . . . , Sn regions in the current frame may be defined as $IC1_{x,y} \varepsilon S1, IC2_{x,y} \varepsilon S1, \ldots, ICn_{x,y} \varepsilon Sn$, and the pixels belonging to each of the S1, S2, . . . , Sn regions in the previous frame may be defined as $IP1_{x,y} \varepsilon S1, IP2_{x,y} \varepsilon S1, \ldots, IPn_{x,y} \varepsilon Sn$.

In this example, the processor 120 may obtain a difference value between respective regions on the basis of the following Equation 13.

$$SD_1 = \sum_{x,y} ABS\left(IC1_{x,y} - IP1_{x,y}\right) = \sum_{x,y}[ABS\,|(IC1_{x,y}R - IP1_{x,y}R)|] + $$
$$ABS\,|(IC1_{x,y}G - IP1_{x,y}G)|) + ABS\,|(IC1_{x,y}B - IP1_{x,y}B)|)];$$
$$SD_2 = \sum_{x,y} ABS\left(IC2_{x,y} - IP2_{x,y}\right) = \sum_{x,y}[ABS\,|(IC2_{x,y}R - IP2_{x,y}R)|] + $$
$$ABS\,|(IC2_{x,y}G - IP2_{x,y}G)|) + ABS\,|(IC2_{x,y}B - IP2_{x,y}B - IP2_{x,y}B)|)];$$
$$SD_n = \sum_{x,y} ABS\left(ICn_{x,y} - IPn_{x,y}\right) = \sum_{x,y}[ABS\,|(ICn_{x,y}R - IPn_{x,y}R)|] + $$
$$ABS\,|(ICn_{x,y}G - IPn_{x,y}G)|) + ABS\,|(ICn_{x,y}B - IPn_{x,y}B)|)].$$

[Equation 13]

Here, the $SD_1$ concept refers to a difference value corresponding to the S1 region, the $SD_2$ refers to a difference value corresponding to the S2 region, and the $SD_n$ may refer to a difference value corresponding to the S1 region.

The processor 120 may identify at least one region of the plurality of first regions based on the difference value identified for each region in operation S840. In this case, the processor 120 may identify a first weight value and a second weight value corresponding to the first depth information and the second depth information based on the first threshold value and the image difference value obtained for only the identified region, and then calculate a final image difference value in operation S850. However, according to an embodiment, the size of the first threshold value may be set differently based on the difference value identified for each region, and the operation S850 may also be performed.

The processor 120 may calculate a pixel difference value (or pixel variation) between adjacent frames corresponding to each segmentation group to use a depth value of a group having a pixel difference value less than a predetermined value as a final depth value, and use a depth value corresponding to pixel values included in the current frame as a final depth value.

Figure 9C:
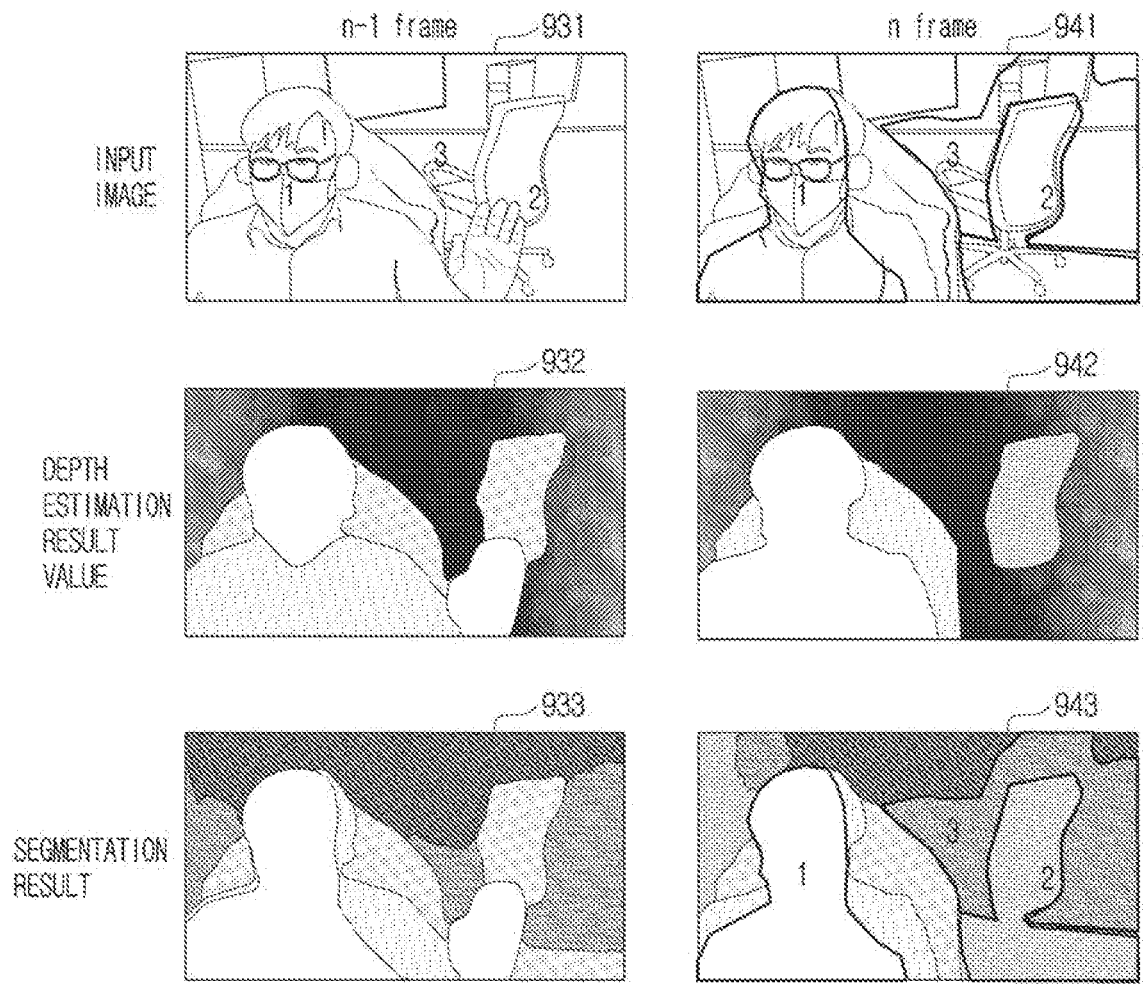

For example, as shown in FIG. 9C, when a current image frame is referred to as an n frame, a result of applying segmentation to the depth estimation value is like a depth image 943 on the right lower end. For example, in the case of a region 1, it may be seen that a feature value (e.g., RGB average, RGB histogram, etc.) of a corresponding region of an image 931 on the uppermost side of the n−1 frame is almost similar to an image feature value of a corresponding region of an n frame. On the other hand, in the case of region 2 and region 3, as shown in image 941, the image features of the n frame and the n−1 frame are changed by the hand region. Therefore, the region 1 may use the depth estimation value of the existing n−1 frame as it is, as shown in image 932, and region 2 and region 3 may use the depth estimation value of the n frame, as shown in image 942. However, when a depth estimation value is directly used, a flicker may occur, and thus a depth estimation value corresponding to a pixel corresponding to the region 2 and region 3 may be obtained by applying a scheme using the threshold value described above.

According to an embodiment, the depth information of a previous frame is used as it is for a region with almost no motion, and depth information is calculated only for the remaining region, and thus the amount of calculation is reduced and the flicker which may occur in a pixel unit may be reduced because the depth information is applied in units of regions.

Although it has been described that segmentation is applied based on the depth estimation value of the current frame in the above-described embodiment, segmentation may be applied based on the depth estimation value of the previous frame, as shown in image 933.

The same/similar processing may be performed without a detailed description of overlapping processing among the various processes illustrated in FIGS. 3 to 9C described above.

Figure 10:
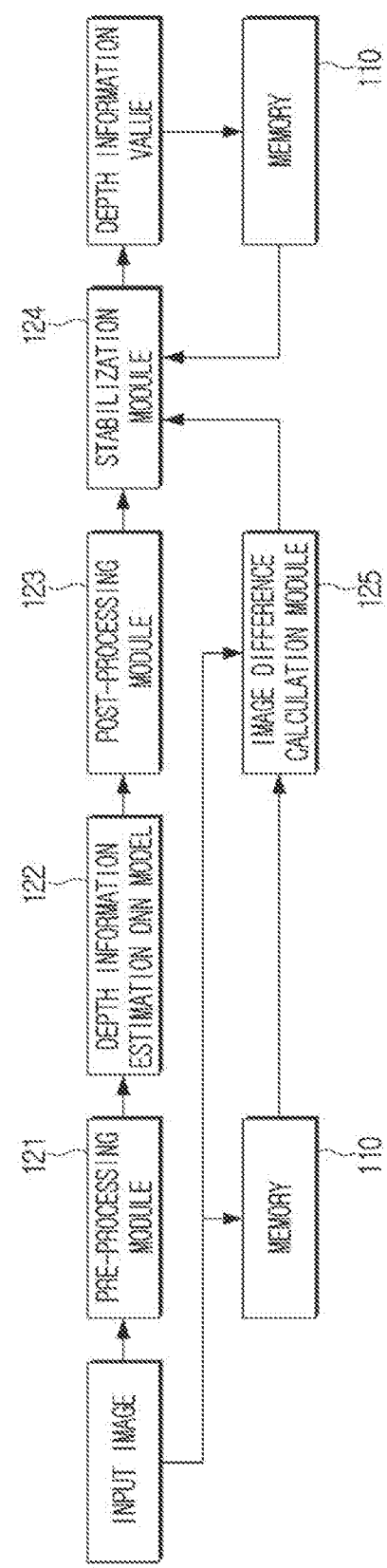
FIG. 10 is a diagram illustrating an operation of an electronic apparatus, according to an embodiment of the disclosure.

FIG. 10 is a diagram illustrating an operation of an electronic apparatus, according to an embodiment of the disclosure.

According to an embodiment illustrated in FIG. 10, when an input image, for example, a first image frame is received, the processor 120 may store the first image frame in the memory 110 and pre-process the first image frame through the pre-processing module 121. Here, the preprocessing may refer to processing an image so that the DNN model 122 may perform inference, and may include, for example, processing of image size adjustment, color region change, image accumulation, and the like. However, embodiments are not limited thereto, and various preprocessing technologies may be applied according to the type, structure, capacity, and the like of the DNN model 122.

The pre-processed first image frame may be input to the DNN model 122 and processed (for example, inferred). For example, an image inputted to the DNN model 122 may be processed by simultaneously utilizing a software platform such as a TFLite, Pytorch and a H/W platform such as GPU or TPU, and the like.

The output value of the DNN model 122 may be post-processed through the post-processing module 123. For example, various processing required for a final end, such as softmax, maxlocation, ROI conversion, etc., may be processed in the platform in an inference process of the artificial intelligence model, or the processor 120 may post-process the DNN result value directly. The processor 120 may obtain depth information of the first image frame based on the post-processing result and store the depth information in the memory 110.

When a second image frame after the first image frame is input, the processor 120 may process the second image frame in the manner described above to obtain depth information of the second image frame.

Also, when a second image frame after the first image frame is input, the processor 120 may store the second image frame in the memory 110, and calculate an image difference value between the first image frame and the second image frame stored in the memory 110 through the image difference calculation module 125.

The processor 120 may obtain a final depth information value corresponding to the second image frame based on the image difference value and the depth information of the first image frame and/or the depth information of the second image frame by using the stabilization module 124.

In the above-described embodiment, the preprocessing module 121, the DNN model 122, the post-processing module 123, the stabilization module 124, and the image difference calculation module 125 have been separately described, but the modules may be implemented with one module according to an example, at least some modules may be combined with existing modules, or an existing module may be modified. In addition, each module may be implemented in at least one hardware, and/or at least one software, or a combination of hardware and software, according to an implementation example.

Figure 11:
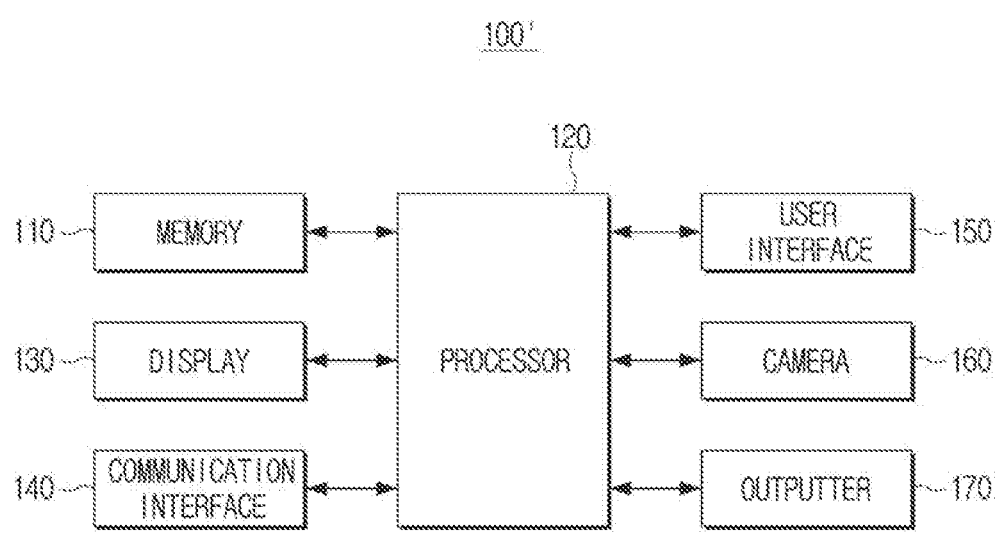
FIG. 11 is a diagram illustrating an implementation example of an electronic apparatus, according to an embodiment of the disclosure.

FIG. 11 is a diagram illustrating an implementation example of an electronic apparatus, according to an embodiment of the disclosure.

Referring to FIG. 11, the electronic apparatus 100' includes a memory 110, a processor 120, a display 130, a communication interface 140, a user interface 150, a camera 160, and an outputter 170. In the configuration illustrated in FIG. 11, a detailed description of a configuration overlapping with the configuration shown in FIG. 2 is omitted.

The display 130 may be implemented as a display including a self-emitting element or a display including a non-self-limiting element and a backlight. For example, the display 130 may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 130, a backlight unit, a driving circuit which may be implemented as an a-si TFT, low temperature poly silicon (LTPS) TFT, organic TFT (OTFT), or the like, may be included as well. The display 130 may be implemented as a touch screen coupled to a touch sensor, a flexible display, a rollable display, a three-dimensional (3D) display, a display in which a plurality of display modules are physically connected, or the like. The processor 120 may control the display 130 to output an output image that is obtained according to various embodiments described above.

The communication interface 140 may communicate with an external device. For example, the communication interface 140 may receive an image signal by streaming or downloading from an external device (for example, a source device), an external storage medium (for example, a universal serial bus (USB) device), an external server (for example, a web hard) through communication methods such as, for example, and without limitation, an access point (AP)-based Wi-Fi (wireless LAN network), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like. The image signal may be a digital image signal of any one of SD, HD, full HD, ultra HD, but the image signal is not limited thereto. According to an embodiment, the processor 120 may transmit the obtained depth information to an external device (for example, an external server, a user terminal, etc.) through the communication interface 140. According to another example, the processor 120 may transmit an image obtained based on the depth information to a wearable device such as a headset, glasses, a helmet, or the like through the communication interface 140.

The user interface 150 may be implemented as a device such as, for example, and without limitation, a button, a touch pad, a mouse, and a keyboard, a touch screen, a remote control transceiver capable of performing the above-described display function and operation input function, or the like. The remote control transceiver may receive a remote control signal from an external remote controller through at least one communication methods such as an infrared rays communication, Bluetooth communication, or Wi-Fi communication, or transmit the remote control signal.

A camera 160 may perform capturing by being turned on according to a predetermined event. The camera 160 may convert the captured image into an electrical signal and generate image data based on the converted signal. For example, a subject may be converted into an electrical image signal through a charge coupled device (CCD) sensor, and the converted image signal may be converted into an amplified signal and a digital signal and then processed.

The outputter 170 may output a sound signal. For example, the outputter 170 may convert the digital sound signal processed by the processor 120 into an analog sound signal, amplify the analog sound signal, and output the analog sound signal. For example, the outputter 170 may include various output circuitry, such as, for example, and without limitation, at least one speaker unit, a D/A converter, an audio amplifier, or the like, capable of outputting at least one channel. According to an example, the outputter 170 may be implemented to output various multi-channel sound signals. The processor 120 may control the outputter 170 to process the input sound signal in accordance with the enhanced processing of the input image. For example, the processor 120 may convert an input two-channel sound signal into a virtual multi-channel (for example, 5.1 channel) sound signal, recognize a position where the electronic apparatus 100' is located to process the signal as a cubic sound signal optimized to a space, or provide an optimized sound signal according to the type of input image (for example, a content genre).

The electronic apparatus 100' may further include at least one of a tuner and a demodulator, according to an implementation example. The tuner may receive a radio frequency (RF) broadcast signal by tuning a channel selected by a user or all the prestored channels, among the RF broadcast signal received through an antenna. The demodulator may receive and demodulate a digital intermediate frequency (DIF) signal converted by the tuner and perform channel decoding, or the like. According to an embodiment, an input image received through a tuner is processed through a demodulator, and then provided to the processor 120 for shadow processing according to an embodiment of the disclosure.

According to various embodiments described above, accurate depth information may be obtained from a 2D image by using a simple image processing technology without having high costs.

The methods according to various embodiments of the disclosure described above may be implemented in the form of an application that may be installed in an existing electronic apparatus. Alternatively, at least some of the methods according to various embodiments of the disclosure described above may be performed using a deep learning-based artificial intelligence model, that is, a learning network model.

The methods according to the various embodiments as described above may be implemented as software upgrade or hardware upgrade for an existing electronic apparatus.

The various embodiments described above may be performed through an embedded server provided in an electronic apparatus, or an external server of at least one electronic apparatus and a display device.

Meanwhile, various embodiments may be implemented in software, including instructions stored on machine-readable storage media readable by a machine (e.g., a computer). An apparatus may call instructions from the storage medium, and execute the called instruction, including an electronic apparatus (for example, an electronic apparatus A) according to the disclosed embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium is tangible, and does not distinguish the case in which a data is semi-permanently stored in a storage medium from the case in which a data is temporarily stored in a storage medium.

According to an embodiment, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., PLAYSTORE™, APPSTORE™) or distributed online directly. In the case of online distribution, at least a portion of the computer program product may be at least temporarily stored or temporarily generated in a server of the manufacturer, a server of the application store, or a machine-readable storage medium such as memory of a relay server.

According to embodiments, the elements (e.g., module or program) described above may include a single entity or a plurality of entities. According to embodiments, at least one element or operation from among the corresponding elements described above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While one or more embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:
a memory configured to store a first image frame and first depth information of the first image frame; and
at least one processor connected to the memory, wherein the at least one processor is configured to:
obtain second depth information of a second image frame that is subsequent to the first image frame,
obtain an image difference value between the first image frame and the second image frame,
identify a first weight corresponding to the first depth information and a second weight corresponding to the second depth information, wherein the first weight and the second weight are based on the obtained image difference value and a threshold value,
obtain final depth information corresponding to the second image frame by applying the first weight to the first depth information and applying the second weight to the second depth information, and
generate, based on the obtained final depth information, an image related to the second image frame or transmit the obtained final depth information to an external device.

2. The electronic apparatus of claim 1, wherein the at least one processor is further configured to identify the first weight and the second weight so that the second weight increases and the first weight decreases in proportion to the image difference value.

3. The electronic apparatus of claim 1, wherein the at least one processor is further configured to obtain the final depth information by applying a third weight for Infinite Impulse Response (IIR) filtering to the first depth information to which the first weight is applied and applying a fourth weight for IIR filtering to the second depth information to which the second weight is applied.

4. The electronic apparatus of claim 1, wherein the at least one processor is further configured to:
segment the second image frame into a plurality of first regions,
identify a second region corresponding to each of the plurality of first regions in the first image frame,
identify a difference value between second regions corresponding to each of the plurality of first regions,
identify at least one region of the plurality of first regions based on the identified difference value, and
identify the first weight corresponding to the first depth information and the second weight corresponding to the second depth information, based on the identified difference value and the threshold value for the identified at least one region.

5. The electronic apparatus of claim 4, wherein the at least one processor is further configured to segment the second image frame into the plurality of first regions based on a depth value for each pixel region included in the second image frame, or segment the second image frame into the plurality of first regions based on a pixel value for each pixel region included in the second image frame.

6. The electronic apparatus of claim 1, wherein the at least one processor is further configured to:
spatially diffuse the image difference value obtained from at least one region included in the first image frame and the second image frame a predetermined number of times, and identify the first weight corresponding to the first depth information and the second weight corresponding to the second depth information, based on the spatially diffused image difference value and the threshold value.

7. The electronic apparatus of claim 1, wherein the at least one processor is further configured to:
obtain a pixel difference value between a plurality of first pixel regions included in the first image frame and a plurality of second pixel regions included in the second image frame, and obtain the image difference value based on the pixel difference value, or
obtain the image difference value based on optical flow information obtained from the first image frame and the second image frame.

8. The electronic apparatus of claim 1, wherein the at least one processor is further configured to:
based on the obtained image difference value being greater than the threshold value, identify the first weight corresponding to the first depth information and the second weight corresponding to the second depth information, based on the image difference value and the threshold value, and
based on the image difference value being less than or equal to the threshold value, obtain a predetermined value as the image difference value.

9. The electronic apparatus of claim 1, wherein the first image frame and the second image frame are two-dimensional monocular image frames.

10. The electronic apparatus of claim 1, further comprising:
a display,
wherein the at least one processor is further configured to:
generate a virtual space image related to the second image frame based on the obtained final depth information, and
control the display to display the virtual space image.

11. An image processing method of an electronic apparatus, the method comprising:
obtaining second depth information of a second image frame that is subsequent to a first image frame;
obtaining an image difference value between the first image frame and the second image frame;
identifying a first weight corresponding to a first depth information and a second weight corresponding to a second depth information, wherein the first weight and the second weight are based on the obtained image difference value and a threshold value;
obtaining final depth information corresponding to the second image frame by applying the first weight to the first depth information and applying the second weight to the second depth information; and
generating, based on the obtained final depth information, an image related to the second image frame or transmitting the obtained final depth information to an external device.

12. The method of claim 11, wherein the identifying the first weight and the second weight comprises identifying the first weight and the second weight so that the second weight increases and the first weight decreases in proportion to the image difference value.

13. The method of claim 11, wherein the obtaining the final depth information comprises obtaining the final depth information by applying a third weight for Infinite Impulse Response (IIR) filtering to the first depth information to which the first weight is applied and applying a fourth weight for IIR filtering to the second depth information to which the second weight is applied.

14. The method of claim 11, further comprising:
segmenting the second image frame into a plurality of first regions;
identifying a second region corresponding to each of the plurality of first regions in the first image frame;
identifying a difference value between second regions corresponding to each of the plurality of first regions; and
identifying at least one region of the plurality of first regions based on the identified difference value;
wherein the identifying the first weight and the second weight comprises identifying the first weight corresponding to the first depth information and the second weight corresponding to the second depth information based on the identified difference value and the threshold value for the identified at least one region.

15. A non-transitory computer readable medium storing computer instructions executed by a processor of an electronic apparatus storing information on an artificial intelligence model, comprising a plurality of layers to cause the electronic apparatus to perform operations including:
obtaining second depth information of a second image frame that is subsequent to a first image frame;
obtaining an image difference value between the first image frame and the second image frame;
identifying a first weight corresponding to a first depth information and a second weight corresponding to a second depth information, wherein the first weight and the second weight are based on the obtained image difference value and a threshold value;
obtaining final depth information corresponding to the second image frame by applying the first weight to the first depth information and applying the second weight to the second depth information; and
generating, based on the obtained final depth information, an image related to the second image frame or transmitting the obtained final depth information to an external device.

16. An electronic apparatus comprising:
a memory configured to store instructions;
at least one processor configured to execute the instructions to:
obtain a first image frame and first depth information of the first image frame;
obtain second depth information of a second image frame that is subsequent to the first image frame,
obtain an image difference value between the first image frame and the second image frame,
identify a first weight corresponding to the first depth information and a second weight corresponding to the second depth information, wherein the first weight and the second weight are based on the image difference value between the first image frame and the second image frame,
obtain final depth information corresponding to the second image frame by applying the first weight to the first depth information and applying the second weight to the second depth information, and
generate an image for the second image frame based on the obtained final depth information.

17. The electronic apparatus of claim 16, wherein the at least one processor is further configured to, based on a size of the image difference value being less than a preset value, obtain the final depth information corresponding to the second image frame.

18. The electronic apparatus of claim 16, further comprising a display, wherein the at least one processor is further configured to control the display to display a virtual space image for the second image frame based on the obtained final depth information.

19. The electronic apparatus of claim 16, wherein the at least one processor is further configured to obtain the first depth information and the second depth information from an external device.

20. The electronic apparatus of claim 16, wherein the at least one processor is further configured to transmit the obtained final depth information to an external device.

* * * * *